United States Patent [19]

Sauvinet et al.

[11] Patent Number: 4,933,211
[45] Date of Patent: Jun. 12, 1990

[54] PROCESS AND DEVICE FOR COATING A SUBSTRATE WITH A PULVERULENT PRODUCT

[75] Inventors: Vincent Sauvinet, Ermenonville; Jean Fosset, Saint Leger Aux Bois; Michel Valere, Thourotte; Daniel Defort, La Croix Saint-Ouen, all of France

[73] Assignee: Saint Gobain Vitrage, Courbevoie, France

[21] Appl. No.: 305,353

[22] Filed: Feb. 1, 1989

Related U.S. Application Data

[63] Continuation-in-part of Ser. No. 816,220, Jan. 6, 1986, Pat. No. 4,824,695.

[30] Foreign Application Priority Data

Feb. 9, 1988 [FR] France .................. 88 01533

[51] Int. Cl.⁵ .................................. B05D 1/12
[52] U.S. Cl. .................................. 427/168; 65/60.1; 65/60.51; 118/308; 118/310; 118/312; 427/180
[58] Field of Search .................. 65/60.1, 60.51; 118/308, 310, 312; 427/180, 168

[56] References Cited

U.S. PATENT DOCUMENTS

| | | | |
|---|---|---|---|
| 4,325,988 | 4/1982 | Wagner | 427/160 |
| 4,349,369 | 9/1982 | Van Laethem | 427/168 |
| 4,349,371 | 9/1982 | Van Laethem | 427/168 X |
| 4,397,259 | 8/1983 | Kanda et al. | 118/323 X |
| 4,397,671 | 8/1983 | Vong | 65/60.52 |
| 4,401,695 | 8/1983 | Sopko | 427/168 |
| 4,705,701 | 11/1987 | Akhtor | 427/168 X |

FOREIGN PATENT DOCUMENTS

| | | |
|---|---|---|
| 188962 | 12/1985 | European Pat. Off. |
| 2202857 | 5/1974 | France |
| 2499058 | 8/1982 | France |

OTHER PUBLICATIONS

H. Komiyama, "Rapid Growth of AlN. Films by Particle-Precipitation Aided Chemical Vapor Deposition", *Japanese Journal of Applied Physics*, vol 24, No. 10, pp. L795–L797, (1985).

*Primary Examiner*—Shrive Beck
*Attorney, Agent, or Firm*—Pennie & Edmonds

[57] ABSTRACT

The invention relates to coating a heated substrate, particularly glass, by a process according to which a distribution nozzle ending in a slot, sprays a gas stream mixed with a pulverulent or powder product, which decomposes in heat, onto a heated substrate for contact therewith to form a thin coating layer thereupon. The coating zone in the vicinity of the main stream of gas-entrained powder coming from the nozzle is cooled to prevent premature decomposition and to directly remove pulverulent products not immediately deposited upon the substrate. Also, a device for carrying out the novel process is disclosed herein. The invention makes it possible to produce a coated glass substrate which is essentially free of the problem of coating fogging.

20 Claims, 1 Drawing Sheet

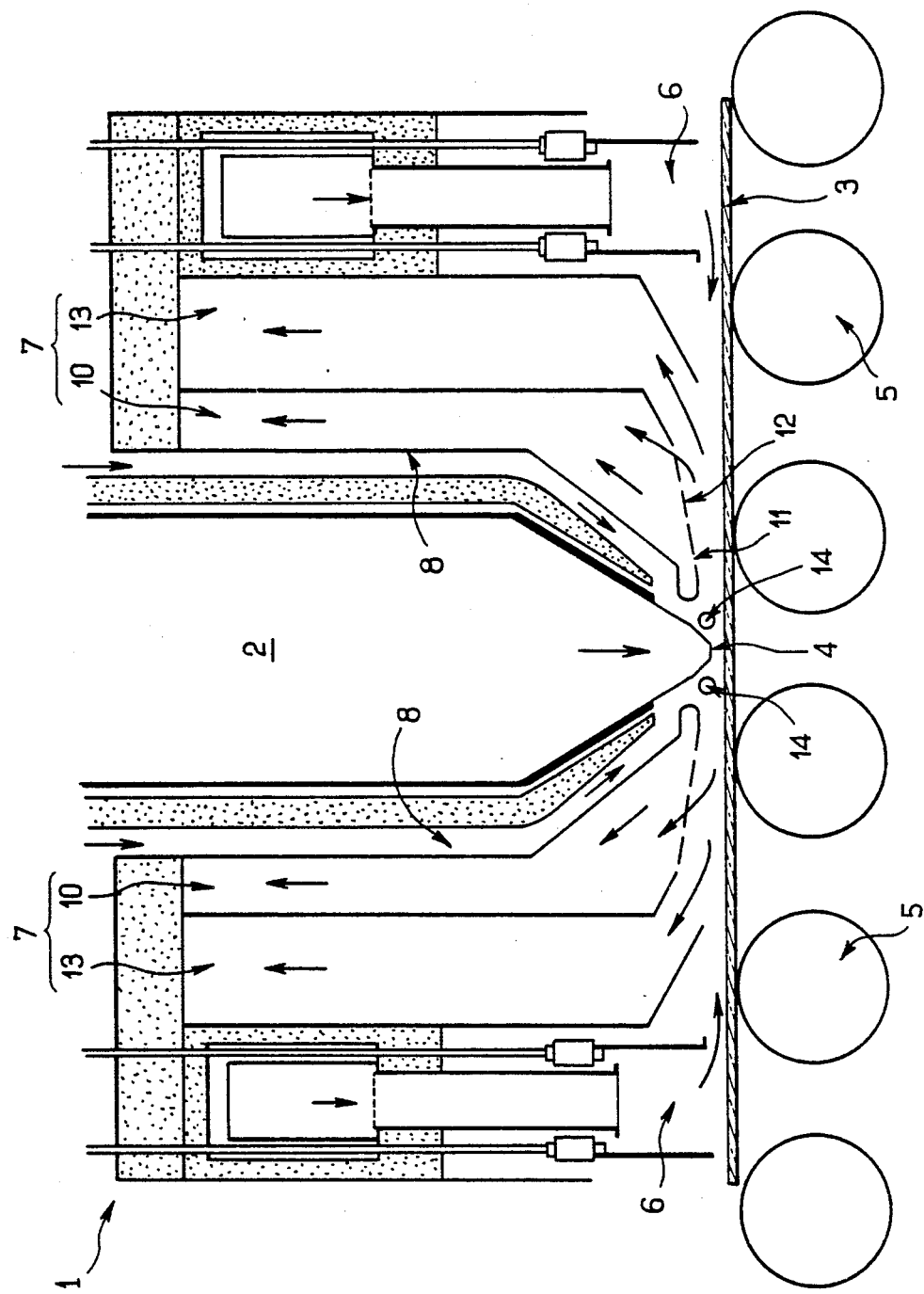

PROCESS AND DEVICE FOR COATING A SUBSTRATE WITH A PULVERULENT PRODUCT

Cross Reference to Related Applications

This application is a continuation-in-part of application Ser. No. 816,220, filed Jan. 6, 1986, now U.S. Pat. No. 4,824,695.

Technical Field

This invention relates to the coating of a heated substrate, particularly a ribbon of glass, by a pulverulent powder product. This process utilizes a distribution nozzle ending in a slot to spray the pulverulent product entrained in a gas stream onto said heated substrate. The pulverulent product decomposes upon contact with the hot substrate to form a thin metal oxide coating layer thereupon.

Background Art

Powder coating techniques are generally used, for example, directly in a flat glass production line to coat the ribbon of glass, shortly after its production, with a metal oxide layer. This metal oxide layer or coating, resulting from the pyrolysis of powdered organometal compounds, imparts to the glass particular qualities with regard to reflection and/or transmission of light and energy. Some halogen compounds in powder form, such as those described in U.S. Pat. No. 4,707,383, are used, for example, to obtain a layer of tin oxide doped with fluorine, which is used primarily for reflecting infrared radiation.

When the gas stream in which the pulverulent product is entrained is sprayed upon the hot ribbon of glass, only a portion of the powder remains on the glass where, under the effect of the high temperature, it decomposes by pyrolysis to form the desired metal oxide layer. To prevent contamination of the coating installation and the resultant metal oxide layer formed thereby, other portions of the gas-entrained powder which have not decomposed are evacuated from the coating zone by slot suction devices placed at a distance from the spray nozzle and parallel to said nozzle.

To increase the proportion of powder caught by the hot ribbon of glass, it was proposed in U.S. Pat. No. 4,824,695 to create and keep between the distribution nozzle and the suction devices at least one eddy current of gas laden with powder. By the rotating circulation of these eddy currents, the particles of powder not initially caught by the substrate are transported toward the suction device. While this circulation does not provide the shortest route to the suction device, the rotational movement of the particles increases their average retention time in the coating zone of the substrate. In effect, the particles sweep the surface of the substrate several times, thus greatly increasing their probability of depositing thereupon and reducing the amount of undeposited powder that must be removed.

Also, for such eddy currents (or vortices), the coating zone must be made of a relatively large dimension. In addition, several injections of hot gas are made in the coating zone so that the substrate, over its entire length which is within the coating zone, is at a temperature sufficient to obtain pyrolysis of the pulverulent product upon contact therewith.

It is observed, however, most particularly for some pulverulent products, that the coating layer exhibits a certain fogging, i.e., the images reflected or transmitted by the coated glass seem to be seen through a fog. Further studies lead to the thought that this fogging problem may be due to the undeposited particles of the pulverulent product being located on both sides of the main stream of the gas entrained pulverulent product stream exiting the distribution nozzle. These particles can decompose in the high-temperature atmosphere of the coating zone and then be incorporated in the coating layer, thus creating the fogging of reflected or transmitted images in the final product.

Often, such undeposited particles are driven away from the substrate when it passes under the distribution nozzle by the combined effect of the force of the mixed powder and gas stream, in combination with the energy "blast" resulting from the rapid decomposition of the powder grains upon the surface of the hot substrate. Occasionally, some powders do not produce a sufficient "blast", and in these situations, the fogging of the coating layer is noted.

Summary of the Invention

The purpose of this invention is to eliminate or at least substantially reduce this fogging phenomenon, which at times appears in coating layers deposited on glass substrates, such coatings obtained by the pyrolysis of pulverulent metal compounds such as those based on tin and/or indium, and more particularly, powdered compounds of dibutyltin oxide (DBTO), dibutyltin difluoride (DBTF), indium formate and the like.

These powders are suspended in a gas and distributed on the heated substrates to be coated from a slot nozzle. The present invention proposes to allow at least one stream of cold gas to be induced in close proximity to the stream of the mixture of powder and gas, and to directly remove by suction any powder which was not initially deposited upon the substrate without creating eddy currents thereof.

The invention also proposes to promote the circulation and direct evacuation of the particles of such non-deposited powder by placing deflectors along the length of the nozzle, thus preventing the formation of eddy currents. Advantageously, the invention further proposes a double suction box on each side of the nozzle in close proximity to the substrate.

The invention also proposes a coating chamber comprising a distribution nozzle ending in a slot for spraying a mixture of powder and gas onto a substrate, particularly glass; suction means framed by adjacent hot gas blowing ramps, and cold gas intake manifolds on each side of the distribution slot of the nozzle. The suction means are placed close to the nozzle and the substrate to directly remove powder not particles which are deposited upon the substrate.

Preferably, to substantially prevent the formation of any vortex or eddy current of powder not deposited upon the substrate, the deposit chamber also includes deflector members, such as bars, placed in close proximity and parallel to the distribution nozzle slot over its entire length.

Brief Description of the Drawings

The invention will now be described in more detail with reference to the accompanying single drawing figure which illustrates a coating chamber of a ribbon of glass from such powdered compounds.

Detailed Description of the Preferred Embodiments

In order to obtain high quality pyrolyzed metal oxide coatings upon glass substrates, it is necessary to deposit powder directly from the distribution slot of the nozzle, i.e., to deposit upon the substrate only the powder contained in the main stream of powder and gas coming from the slot. Powder not directly coming from the nozzle, i.e., that which is dispersed laterally within the coating chamber, is quite likely to decompose in the hot atmosphere of the chamber prior to contacting the substrate. Therefore, such powder should not participate in the formation of the coating layer to avoid the fogging problem mentioned above. By minimizing the amount of indirectly deposited powder, optimum properties of the coating are achieved.

To prevent this indirect portion of the powder belonging to what is called a lateral flow from decomposing into fine particles which are likely to be incorporated in the layer formed by the powder directly from the main stream, the invention proposes to eliminate this lateral flow as rapidly as possible by removing it from the coating zone. This will prevent its decomposition into fine particles and the generation of the fogging problem in the final coated glass product.

The process necessary to obtain this rapid removal is explained below in connection with the description of the equipment designed for this purpose.

Coating chamber 1 shown in the figure essentially comprises a nozzle 2 for spraying mixed powder and gas, which ends in a low tapered part having a longitudinal slot 4 opposite the substrate 3 to be coated. This nozzle 2 will not be described here, as it was the object of U.S. Pat. No. 4,533,571, the disclosure of which is incorporated herein by reference to the extent needed to understand the present invention. This nozzle 2 distributes a main stream of powder and gas with considerable energy, so that a coating layer of good quality, adhering perfectly well to the substrate, may be obtained.

Substrate 3 is, for example, a ribbon of glass produced by the float glass process, passing beneath nozzle 2 while being transported on rollers 5. Substrate 3, when it is glass, is heated to a temperature on the order of 600° C., since this is the necessary temperature for decomposing the pulverulent product.

As known, coating chamber 1 is framed upstream and downstream from nozzle 2 by hot gas blowing ramps 6, upstream and downstream being determined as a function of the direction of advance of the ribbon of glass to be coated. These ramps 5 blow their hot gas close to the surface of substrate 3 to maintain the temperature of the heated substrate at the described level.

Coating chamber 1 also possesses suction means 7 intended to evacuate the pulverulent products not retained on the substrate. Chamber 1 according to the invention further comprises gas intakes 8, in general of cold, i.e., unheated air, located on each side of nozzle 2, in close proximity to the spraying slot 4. These gas intakes 8 are connected to the ambient surrounding atmosphere, or if desired, to the chambers of controlled atmosphere of inert gas (not illustrated). The stream of gas and powder exiting slot 4, sucks in the adjacent atmosphere through these gas intakes 8 and in particular promotes the circulation of air toward the substrate. This air introduced in the area around the main stream coming from slot 4 does not interfere with that stream, but cools the immediate vicinity around it, thus preventing any powder which has escaped from the main stream or which did not deposit and is laterally dispersed, from decomposing in the coating zone due to the effect of heat. This laterally dispersed powder is sometimes called a lateral flow stream.

The powder belonging to the lateral flow streams upstream and downstream from the nozzle 2 is then evacuated from the coating chamber as fast and as directly as possible. This evacuation or removal effectively prevents the lateral flow stream from participating in the formation of the coating layer, from forming decomposed particles, and from accumulating on the walls of the installation. Such accumulations contaminate the installation and runs the risk of later falling off the wall and onto the glass, thus forming defects in the coating layer.

Suction means 7 are placed and shaped to rapidly and directly to perform this evacuation of undeposited powder. They are placed close to the tip of nozzle 2, so as to not leave sufficient space for the powder to form a deposit and/or form vortices or eddy currents.

To guarantee a better evacuation of the non-deposited powder, a double level of suction is created on each side of the main nozzle stream. A first suction box 10 is located very near to nozzle 2 and descends to the area around substrate 3, approximately at the same level as the tip of the nozzle. The lower end of this box communicates with the coating zone by orifices 11 pierced through a wall 12 closing box 10 downward, this wall 12 exhibiting a slight incline in relation to the plane of the substrate. The lowest point of this wall 12 is closer to the substrate than to the nozzle.

Considering the symmetry of the installation, the plane of symmetry passing through the nozzle and more precisely through slot 4 defines two boxes 10 placed parallel to nozzle 2, one upstream, the other downstream. The second level of suction consists of second boxes 13, farther from the nozzle than boxes 10.

Further, deflectors 14, such as, for example, cylindrical bars, can be added in close proximity and parallel to the tip of the nozzle, to promote the circulation and evacuation of undeposited powder toward suction boxes 10 and 13 without generating vortices or eddy currents. These deflectors 14 are advantageously placed over the entire length of slot 4 in parallel relationship thereto.

The bottoms of the walls of the suction boxes and in particular the connection of the bottom of box 10 with inclined wall 12 are streamlined to promote the flow and direct suction of the powder not deposited upon the substrate. Thus, the surplus of non-deposited powder contained in the lateral flow streams, are cooled by the induced air (or gas) from intakes 8. This non-deposited powder is further subjected to the action of the suction means 7 (boxes 10 and 13) so that it is directed through orifices 11 of wall 12 by the suction as well as by the optional deflectors 14, thereby preventing any formation of vortices.

Further, the hot gases introduced by ramps 6 prevent the induced gas from cooling the glass, as this would be detrimental to the pyrolysis of the powder on the substrate. Therefore, the quality of the layer and the output of the pyrolysis are maintained at high levels. These hot gases also assist in keeping the glass hot, and even in heating it. Another benefit is that they promote the separation of sucked-in stream of powder away from the surface of the glass. The suction force and blowing of hot gases can be adjusted to the desired values.

The length of a coating chamber according to this invention is reduced in relation to the length of a chamber of prior art, from which come fewer possibilities for the powder not contained in the main stream and/or not caught by the substrate to come into contact with the substrate. Thus, the formation of a deposit which exhibits the fogging problem described above is avoided.

While it is apparent that the invention herein disclosed is will calculated to fulfill the desired results, it will be appreciated that numerous modifications and embodiments may be devised by those skilled in the art, and it is intended that the appended claims cover all such modifications and embodiments as fall within the true spirit and scope of the present invention.

What is claimed is:

1. A process for coating a heated substrate with a metal oxide coating obtained by pyrolysis of a pulverulent product thereupon, which process comprises:
   directing a stream of gas-entrained pulverulent product towards the heated substrate from a slot of a distribution nozzle, said stream having sufficient energy to propel the pulverulent product onto said heated substrate for pyrolysis thereupon;
   cooling the regions immediately adjacent said gasentrained pulverulent powder stream to prevent the decomposition of pulverulent product which does not initially deposit upon said heated substrate while removing a substantial amount of said initially non-deposited pulverulent product without forming eddy currents therewith so as to avoid creating zones of fogging in said metal oxide coating due to incorporation of said initially non-deposited pulverulent product in said coating; and
   injecting at least one hot gas stream into the coating zone at the level of the substrate to maintain the temperature of the substrate and to assist in the removal of the initially non-deposited pulverulent product.

2. The process of claim 1 wherein said cooling is accomplished by introducing at least one gas stream adjacent said gas-entrained pulverulent product stream.

3. The process of claim 2 wherein said at least one gas stream is introduced by induction due to the flow of the product stream.

4. The process of claim 2 wherein first and second gas streams are introduced; one on each side of said nozzle.

5. The process of claim 1 wherein the non-deposited pulverulent product is removed by at least two suction devices located on one side of said nozzle.

6. The process of claim 5 wherein at least two suction devices are provided on each side of said nozzle.

7. The process of claim 1 which further comprises deflecting said initially non-deposited pulverulent product to assist in its cooling and removal.

8. The process of claim 2 wherein the cooling gas stream is introduced in close proximity to the nozzle and to the substrate.

9. A process for coating a heated substrate with a metal oxide coating obtained by pyrolysis of a pulverulent product thereupon, which process comprises:
   directly a stream of gas-entrained pulverulent product towards the heated substrate from a slot of an elongated distribution nozzle, said nozzle extending across the width of the heated substrate and said stream having sufficient energy to propel the pulverulent product onto said heated substrate for pyrolysis thereupon;
   introducing first and second gas streams adjacent said gas-entrained pulverulent product stream, one on each side of said nozzle, said first and second gas streams induced therein by the flow of said product stream, for cooling the regions immediately adjacent said product stream to prevent the decomposition of pulverulent product which does not initially deposit upon said heated substrate;
   directly removing a substantial portion of said non-deposited product without forming eddy currents therewith so as to avoid creating zones of fogging in said metal oxide coating due to incorporation of said initially non-deposited pulverulent product in said coating; and
   deflecting said initially non-deposited pulverulent product around an elongated structural member which is positioned parallel to said elongated distribution nozzle to assist in the cooling and removal of such non-deposited pulverulent product.

10. The process of claim 9 wherein the non-deposited pulverulent product is removed by at least two suction devices located on each side of said nozzle.

11. The process of claim 10 which further comprises deflecting said initially non-deposited pulverulent product to assist in its cooling and removal.

12. The process of claim 9 wherein the cooling gas stream is introduced in close proximity to the nozzle and to the substrate.

13. A chamber for coating a heated substrate with a metal oxide coating obtained by pyrolysis of a pulverulent product thereupon, said chamber comprising:
   a distribution nozzle ending in a slot for directing a stream of gas-entrained pulverulent product towards the heated substrate with sufficient energy to propel the pulverulent product onto said heated substrate for pyrolysis thereupon;
   suction means on each side of said nozzle for removing pulverulent product which does not deposit upon said substrate;
   means for introducing hot gas to maintain the temperature of the substrate and to direct the pulverulent product which does not deposit away from the surface of the substrate; said means located on the side of each said suction means opposite said nozzle; and
   means for cooling the regions immediately adjacent said gas-entrained pulverulent product stream to prevent the decomposition of pulverulent product which does not initially deposit upon said heated substrate.

14. The chamber of claim 12 which further comprises means for deflecting said non-deposited pulverulent product toward said suction means without creating eddy currents therefor.

15. The chamber of claim 14 wherein the deflection means comprises a pair of bar members placed parallel to the distribution nozzle slot.

16. The chamber of claim 12 wherein each suction means comprises a suction box having an entry wall slightly angled with relation to the substrate, said wall having a plurality of orifices for entry of said non-deposited pulverulent material.

17. The chamber of claim 13 wherein said suction means comprises a plurality of suction levels in close proximity to said substrate.

18. The chamber of claim 17 wherein each suction means comprises two suction boxes, one of which has an entry wall slightly angled with relation to the substrate, said wall having a plurality of orifices for entry of said nondeposited pulverulent material.

19. The process of claim 13 wherein the means for cooling is located in close proximity to the nozzle and to the substrate.

20. A chamber for coating a heated substrate with a metal oxide coating obtained by pyrolysis of a pulverulent product thereupon, said chamber comprising:

a distribution nozzle ending in a slot for directing a stream of gas-entrained pulverulent product towards the heated substrate with sufficient energy to propel the pulverulent product onto said heated substrate for pyrolysis thereupon;

at least two suction boxes adjacent each side of said nozzle, one of which has an entry wall slightly angled with relation to the substrate, said wall having a plurality of orifices for entry of said nondeposited pulverulent material;

means for introducing hot gas along said substrate to maintain the temperature of the substrate and to direct the pulverulent product, which does not deposit, away from the surface of the substrate, said hot gas introducing means located on the side of said suction boxes opposite said nozzle; and two deflector bars placed parallel to the distribution nozzle slot, one on each side thereof and extending the length of said nozzle, for deflecting said nondeposited pulverulent product toward said suction boxes without creating eddy currents thereof for removal from said chamber.

* * * * *